United States Patent
Lokkinen

(10) Patent No.: US 10,648,606 B2
(45) Date of Patent: May 12, 2020

(54) METHOD OF REDUCING LEAK OR RISK OF LEAK IN PIPE SYSTEM

(71) Applicant: Innotia Eesti Oü, Tallinn (EE)

(72) Inventor: Mika Lokkinen, Porvoo (FI)

(73) Assignee: Picote Solutions Inc., Sammamish, WA (US)

( * ) Notice: Subject to any disclaimer, the term of this patent is extended or adjusted under 35 U.S.C. 154(b) by 130 days.

(21) Appl. No.: 15/829,892

(22) Filed: Dec. 2, 2017

(65) Prior Publication Data

US 2019/0162352 A1 May 30, 2019

(30) Foreign Application Priority Data

Nov. 29, 2017 (EP) .................................. 17204274

(51) Int. Cl.
| F16L 55/164 | (2006.01) |
| C09J 1/00 | (2006.01) |
| B05D 7/22 | (2006.01) |
| C09K 3/12 | (2006.01) |
| F16L 58/08 | (2006.01) |

(52) U.S. Cl.
CPC ............ *F16L 55/164* (2013.01); *B05D 7/222* (2013.01); *C09J 1/00* (2013.01); *C09K 3/12* (2013.01); *F16L 58/08* (2013.01)

(58) Field of Classification Search
None
See application file for complete search history.

(56) References Cited

U.S. PATENT DOCUMENTS

| 4,554,178 A | 11/1985 | Yamamoto et al. |
| 5,665,903 A * | 9/1997 | Moran ................. G01M 3/2853 73/40.7 |
| 8,486,314 B1 * | 7/2013 | Terry ......................... B05C 7/04 264/36.1 |
| 2002/0050343 A1 * | 5/2002 | Kawamoto ............. C23C 30/00 165/133 |
| 2003/0219542 A1 * | 11/2003 | Ewasyshyn ............. C23C 24/04 427/180 |
| 2005/0173012 A1 * | 8/2005 | McKeen .................. F16L 9/121 138/146 |
| 2015/0024125 A1 * | 1/2015 | Gillanders ............... B05D 3/12 427/140 |
| 2016/0340543 A1 * | 11/2016 | Maeda .................. F16L 55/164 |
| 2017/0248265 A1 | 8/2017 | Gillanders et al. |

FOREIGN PATENT DOCUMENTS

DE 4404473 9/1995

OTHER PUBLICATIONS

Anonymous: "xylenes," Jan. 1, 2000, XP055476138, Retrieved from the Internet: http://citenpl.internal.epo.org/wf/web/citenpl/citenpl.html.

* cited by examiner

*Primary Examiner* — Duy Vu N Deo
*Assistant Examiner* — Bradford M Gates
(74) *Attorney, Agent, or Firm* — Fasth Law Offices; Rolf Fasth

(57) ABSTRACT

A method of reducing a leak or a risk of a leak of a pipe system is disclosed. The pipe system is filled with a composition that includes metal powder and xylenes, and a pressure is applied to the filled pipe system and the pipe system is drained of said composition. Also, the use of a composition for reducing a leak or a risk of a leak of a pipe system is disclosed.

11 Claims, 2 Drawing Sheets

METHOD OF REDUCING LEAK OR RISK OF LEAK IN PIPE SYSTEM

PRIOR APPLICATION

This is a U.S application that claims priority from European Patent Application No. 17204274.9, filed 29 Nov. 2017.

FIELD OF THE INVENTION

The invention relates to a method of repairing pipes and in particular to a repair method in which the pipes are filled with sealing composition for reducing a leak or risk of a leak.

BACKGROUND AND SUMMARY OF THE INVENTION

Pipes are used as utility conduits for gases and liquids. Typically a large main pipe is placed under a paved street and smaller lateral pipes connect the main pipe to houses next to the street. These pipes can be for example stainless steel pipes for carrying natural gas to consumers. The pipes corrode and degrade over time creating tiny holes which leak gas. Therefore the pipes require maintenance or ultimately replacement. Gas pipes can be small in diameter. Typical lateral pipes can be about 20 to 30 mm in diameter which makes lining of the pipes impossible with inverting liners, a method known from sewer pipe rehabilitation. The pipes are also too small for spray coating or brush coating, methods also known from sewer pipe rehabilitation. Replacement of the pipes is also problematic since gas pipes are often in densely populated areas, under streets and buildings.

It is an object of the invention to present a method of reducing leaks in pipes which are difficult to access with tools.

BRIEF DESCRIPTION OF THE DRAWINGS

In the following, the present invention is described in greater detail by means of preferred embodiments with reference to the accompanying drawings, in which.

DETAILED DESCRIPTION OF THE INVENTION

Embodiments of this disclosure are based on use of a sealing composition which is a single component composition comprising metal powder and xylenes. Preferably, a pipe system is completely filled with the sealing composition and pressurized so that the sealing composition penetrates any apertures, holes, joints or other leaking structures. Finally, the sealing composition is drained from the pipe system leaving a film on the inner surface of the pipe system and in apertures, holes, joints and other leaking structures thereby reducing or stopping leaking of the pipe system. The disclosed embodiments of a method can be used for reducing a leak in a pipe system or for reducing a risk of a leak in a pipe system.

In the context of this disclosure, a single component composition means that it may be delivered in a ready for use condition, without the need of mixing it with thickening or curing agents. As an example, a two component epoxy consisting of epoxy resin and hardener which are mixed together prior to use, is not considered as being a single component composition in this disclosure.

Embodiments of this disclosure are suitable for treating pipe systems comprising metal pipes, especially steel pipes and stainless steel pipes. Said embodiments are suitable for pipe diameters of two inch, 50 mm, one and quarter inch, 32 mm, one inch, 25 mm and/or smaller than one inch or smaller than 25 mm. The pipe systems can be industrial pipe systems or utility pipe systems delivering gas or liquid, such as compressed air, natural gas, LNG, steam, process fluids or any other fluids.

Figure 1:
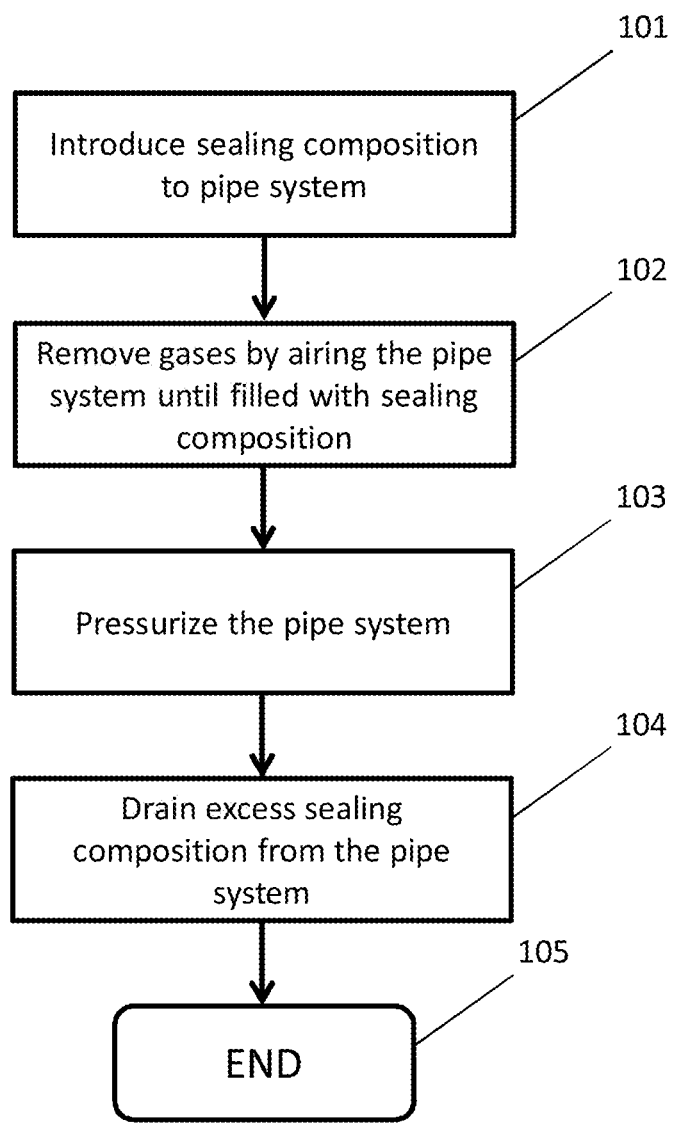
FIG. 1 shows a simple example of a method according to an embodiment of the invention.

Referring now to FIG. 1, a simplified example of a method according to an invention is described in detail. The method of FIG. 1 consists of four consecutive steps 101 to 104 after which the method ends 105.

Step 101: Sealing composition is introduced into a pipe system. Preferably the sealing composition is pumped into the pipe system either directly or via expansion tank. The pipe system can comprise one or more main pipes having smaller lateral pipes in fluid connection to one or more main pipes, such as a gas distribution network in a city, or a portion of said gas distribution network. Large pipe systems are preferably divided into smaller pipe systems by plugging pipes or closing valves prior to Step 101. A suitable size for a pipe system to be treated with this method is such a size which can be reliably treated without unintended drying of a sealing composition or other similar problems. A pipe system can also be an internal pipe system inside a building, such as a gas pipe system delivering gas for stoves and heating furnaces of the building.

The sealing composition is preferably a single component composition comprising metal powder and xylenes. More preferably said sealing composition is a single component composition comprising metal powder and at least one of m-xylene, p-xylene and o-xylene. Most preferably said sealing composition is a single component composition comprising at least 3 weight percent and/or at most 5 weight percent and/or at most 50 weight percent of metal powder and at least 25 weight percent but less than 50 weight percent of reaction mass of m-xylene and o-xylene and p-xylene and ethylbenzene. Preferably said metal powder is aluminium powder or zinc powder. Said sealing composition can also comprise at least 3 weight percent and/or at most 5 weight percent of zinc oxide. Said sealing composition has solids content of preferably at least 40% of weight, more preferably at least 50% of weight and most preferably 50% to 55% of weight. The sealing composition is preferably physically drying composition that dries solely by evaporation of solvent(s). In an embodiment the sealing composition comprises aluminium oxide. In an embodiment the xylenes can be substituted with another solvent resulting similar coating and/or sealing properties as xylene-based compositions when used in the disclosed method as a sealing composition.

Step 102: Removing gases from said pipe system and filling the pipe system with said sealing composition. In Step 101 a formation of air pockets or gas pockets within the pipe system is practically inevitable. Therefore any gases are removed from the pipe system. Gases removed from the system are substituted with the sealing composition until the pipe system is filled with the sealing composition. When the pipe system is fully filled, the sealing composition is in contact with preferably 95%, more preferably 99% and most preferably about 100% or 100% of exposed inner surface of the pipe system. The exposed inner surface of the pipe system is the area of the pipe system that is treated which is in contact with a fluid that completely fills the pipe system.

The removing of gases can be done by airing each pipe of the pipe system. The airing of the pipes can be performed by opening a valve, connection, tap or pipe at an end opposite to an end from which the sealing composition is introduced to the pipe or pipe system. For example, a pipe system consisting of a main pipe and several lateral pipes serving nearby houses can be filled by introducing the sealing composition in to the main pipe and airing the lateral lines one by one by opening the end of the lateral lines in the houses while a pump pumps more sealing composition in to the main pipe as gases are aired in the houses at the end of lateral lines. Any accidental draining of sealing composition is collected to a container and can be re-used by introducing it back to the pipe system via said pump.

Step 103: Applying pressure to said sealing composition within said pipe system. As disclosed in Step 101, the sealing composition is pumped into the pipe system either directly or via expansion tank. The pump is operated to maintain a super-atmospheric pressure within the pipe system once the pipe system has been aired and filled with the sealing composition. Said pressure is preferably 100 to 500 kPa and more preferably 150 to 300 kPa. Said pressure should not exceed the maximum allowed pressure of the pipe system or any part of it. The pressure causes the sealing composition to penetrate into any apertures, holes, joints or other leaking or degraded structures. Preferably leak flow rate of the sealing composition is measured during this step to estimate amount of sealing composition leaking from the pipe system in case the pressure tends to decrease over time.

The pressure is maintained for a certain period of time to ensure proper penetration of the sealing composition. The pressure can be maintained for e.g. 1 second to 1 hour, preferably 10 seconds to 10 minutes and most preferably 15 seconds to 5 minutes.

Step 104: Draining said pipe system partially of said sealing composition and collecting the drained sealing composition. The term partial draining refers to draining of the sealing composition until any puddles or small pools of the sealing composition has been removed from the pipe system. After said partial draining a thin film of the sealing composition covers the inner surface of the pipe system, preferably 95%, more preferably 99% and most preferably about 100% or 100% of exposed inner surface of the pipe system. Said film also covers possible apertures, holes, joints and other leaking structures thereby reducing or stopping leaking of the pipe system. Thickness of said film is preferably on average less than 500 micrometers, more preferably less than 300 micrometers and most preferably 50 to 200 micrometers on the inner surface of the pipe system.

The draining can be facilitated with a suction pump, blowing of air, suction of air or with other means for draining a liquid. The drained sealing composition is collected into a container, such as a sealable tank, for reusing the sealing composition in the same pipe system or another pipe system later on. Since the sealing composition is a single component composition, the drained sealing composition can be stored for a long period of time in a closed container, and re-used e.g. in another pipe system. If needed, a suitable thinner, such as xylenes, can be used for restoring original viscosity of the sealing composition if a lengthy storage period has caused drying of the drained sealing composition.

The pipe system is now treated with the sealing composition and is allowed to dry, for example 8 hours, 24 hours or until the sealing composition is completely dry before the pipe system is used again.

Figure 2:
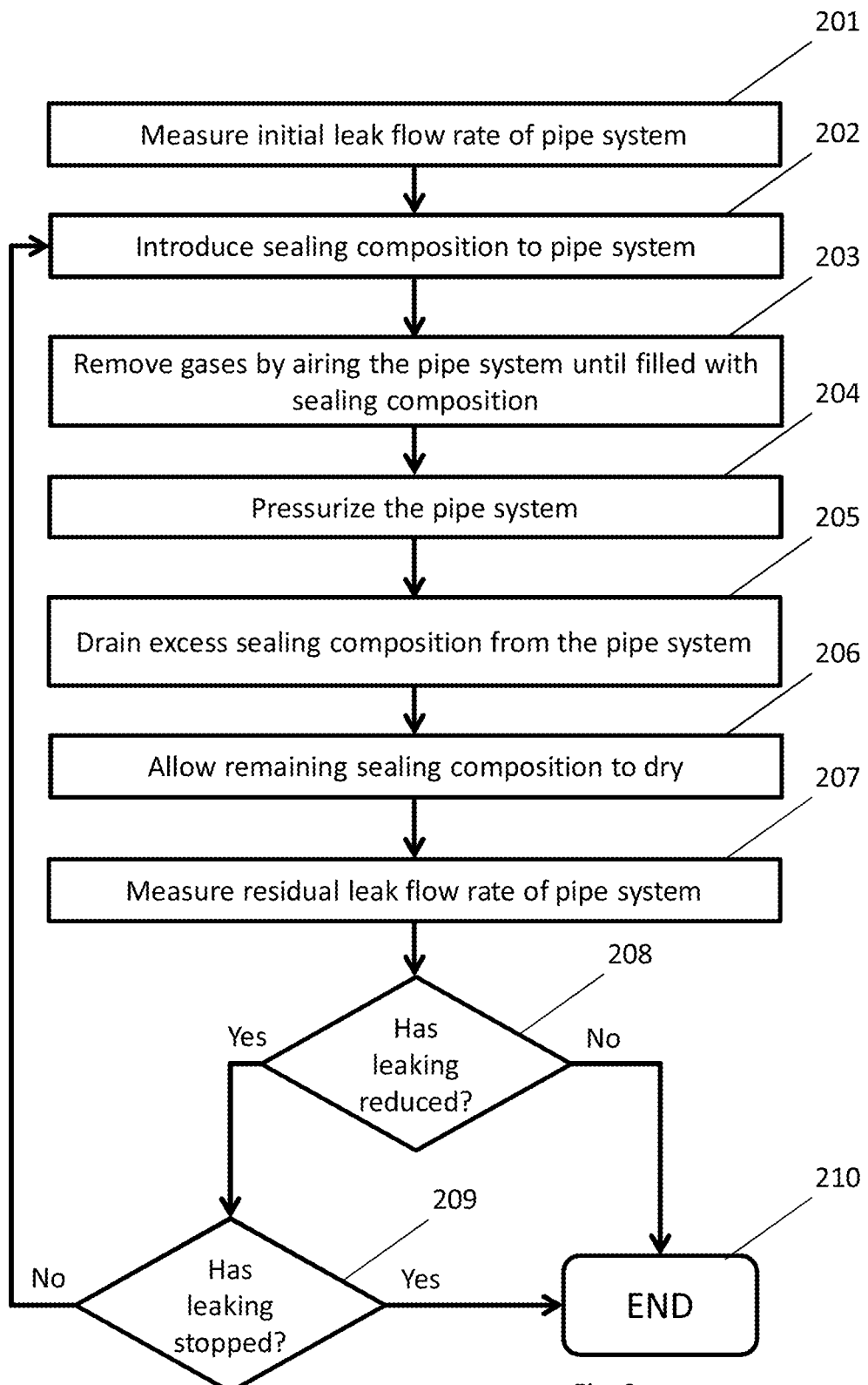
FIG. 2 shows an example of an iterative method according to an embodiment of the invention.

Referring now to FIG. 2, an example of an iterative method according to an embodiment of the invention is described in detail. The method of FIG. 2 consists of seven steps 201 to 207 after which the method either ends 210 or steps 202 to 207 are repeated depending whether conditions 208 and/or 209 are satisfied or not.

Step 201: A leak flow rate of the pipe system is measured. The leak flow rate is measured when the pipe system is in its initial condition, prior to Step 202 of introducing a sealing composition into said pipe system. The measuring of leak flow rate can be realized for example by pumping of air into the pipe system until a predetermined air pressure within the pipe system is reached and monitoring change of pressure over time. Also other leak flow rate measurements known in the art can be used. The resulting leak flow rate is an initial leak flow rate.

Step 202: Sealing composition is introduced into a pipe system. Preferably the sealing composition is pumped into the pipe system either directly or via expansion tank. The pipe system can comprise one or more main pipes having smaller lateral pipes in fluid connection to one or more main pipes, such as a gas distribution network in a city, or a portion of said gas distribution network. Large pipe systems are preferably divided into smaller pipe systems by plugging pipes or closing valves prior to Step 201. A suitable size for a pipe system to be treated with this method is such a size which can be reliably treated without unintended drying of a sealing composition or other similar problems. A pipe system can also be an internal pipe system inside a building, such as a gas pipe system delivering gas for stoves and heating furnaces of the building.

The sealing composition is preferably a single component composition comprising metal powder and xylenes. More preferably said sealing composition is a single component composition comprising metal powder and at least one of m-xylene, p-xylene and o-xylene. Most preferably said sealing composition is a single component composition comprising at least 3 weight percent and/or at most 5 weight percent and/or at most 50 weight percent of metal powder and at least 25 weight percent but less than 50 weight percent of reaction mass of m-xylene and o-xylene and p-xylene and ethylbenzene. Preferably said metal powder is aluminium powder or zinc powder. Said sealing composition can also comprise at least 3 weight percent and/or at most 5 weight percent of zinc oxide. Said sealing composition has solids content of preferably at least 40% of weight, more preferably at least 50% of weight and most preferably 50% to 55% of weight. The sealing composition is preferably physically drying composition that dries solely by evaporation of solvent(s). In an embodiment the sealing composition comprises aluminium oxide. In an embodiment the xylenes can be substituted with another solvent resulting similar coating and/or sealing properties as xylene-based compositions when used in the disclosed method as a sealing composition.

Step 203: Removing gases from said pipe system and filling the pipe system with said sealing composition. In Step 201 a formation of air pockets or gas pockets within the pipe system is practically inevitable. Therefore any gases are removed from the pipe system. Gases removed from the system are substituted with the sealing composition until the pipe system is filled with the sealing composition. When the pipe system is fully filled, the sealing composition is in contact with preferably 95%, more preferably 99% and most preferably about 100% or 100% of exposed inner surface of the pipe system. The exposed inner surface of the pipe system is the area of the pipe system that is treated which is in contact with a fluid that completely fills the pipe system.

The removing of gases can be done by airing each pipe of the pipe system. The airing of the pipes can be performed by opening a valve, connection, tap or pipe at an end opposite to an end from which the sealing composition is introduced to the pipe or pipe system. For example, a pipe system consisting of a main pipe and several lateral pipes serving nearby houses can be filled by introducing the sealing composition in to the main pipe and airing the lateral lines one by one by opening the end of the lateral lines in the houses while a pump pumps more sealing composition in to the main pipe as gases are aired in the houses at the end of lateral lines. Any accidental draining of sealing composition is collected to a container and can be re-used by introducing it back to the pipe system via said pump.

Step 204: Applying pressure to said sealing composition within said pipe system. As disclosed in Step 202, the sealing composition is pumped into the pipe system either directly or via expansion tank. The pump is operated to maintain a super-atmospheric pressure within the pipe system once the pipe system has been aired and filled with the sealing composition. Said pressure is preferably 100 to 500 kPa and more preferably 150 to 300 kPa. Said pressure should not exceed the maximum allowed pressure of the pipe system or any part of it. The pressure causes the sealing composition to penetrate into any apertures, holes, joints or other leaking or degraded structures. Preferably leak flow rate of the sealing composition is measured during this step to estimate amount of sealing composition leaking from the pipe system in case the pressure tends to decrease over time. The resulting leak flow rate is a sealing composition leak flow rate.

The pressure is maintained for a certain period of time to ensure proper penetration of the sealing composition. The pressure can be maintained for e.g. 1 second to 1 hour, preferably 10 seconds to 10 minutes and most preferably 15 seconds to 5 minutes.

Step 205: Draining said pipe system partially of said sealing composition and collecting the drained sealing composition. The term partial draining refers to draining of the sealing composition until any puddles or small pools of the sealing composition has been removed from the pipe system. After said partial draining a thin film of the sealing composition covers the inner surface of the pipe system, preferably 95%, more preferably 99% and most preferably about 100% or 100% of exposed inner surface of the pipe system. Said film also covers possible apertures, holes, joints and other leaking structures thereby reducing or stopping leaking of the pipe system. Thickness of said film is preferably on average less than 500 micrometers, more preferably less than 300 micrometers and most preferably 50 to 200 micrometers on the inner surface of the pipe system.

The draining can be facilitated with a suction pump, blowing of air, suction of air or with other means for draining a liquid. The drained sealing composition is collected into a container, such as a sealable tank, for reusing the sealing composition in the same pipe system or another pipe system later on. Since the sealing composition is a single component composition, the drained sealing composition can be stored for a long period of time in a closed container, and re-used e.g. in another pipe system. If needed, a suitable thinner, such as xylenes, can be used for restoring original viscosity of the sealing composition if a lengthy storage period has caused minor drying of the drained sealing composition. Two component compositions, such as epoxies, are not suitable since after mixing of the two components, the curing process can not be stopped or delayed. If a two component composition was used, it would cure soon after draining, in best case scenario, and would render itself to a large amount of waste. Each treatment would require a new composition to be mixed and then disposed which would create huge amount of waste and make the method unfeasible both ecologically and economically.

Step 206: The sealing composition remaining in the pipe system is allowed to dry after draining of excess sealing composition. The remaining sealing composition is allowed to dry, for example 8 hours, 24 hours or until the sealing composition is completely dry. If any leaking was detected, the dried sealing composition has now formed a film narrowing or even plugging any holes, apertures, cracks and other leaking parts of the pipe system. The non-leaking parts are strengthened due to the thin film formed by the dried sealing composition. Said thin film is mostly or completely formed of the metal powder and possible other metal constituents of the sealing composition thereby constructing a metal layer which strengthens the pipe and is similar in characteristics of the original pipe system. For example the metal layer, formed from the drying thin film of sealing composition as solvents evaporate, can withstand temperatures much higher than 100 degrees Celsius and it also has good resistance against solvents and abrasion unlike epoxy and other polymer coatings.

Step 207: A leak flow rate of the pipe system is measured. The leak flow rate is measured when the sealing composition of the recently treated pipe system has dried at least enough that it will not be damaged by the leak flow measurement. The measuring of leak flow rate can be realized for example by pumping of air into the pipe system until a predetermined air pressure within the pipe system is reached and monitoring change of pressure over time. Also other leak flow rate measurements known in the art can be used. Preferably the same measuring method is used as in Step 201. The resulting leak flow rate is a residual leak flow rate.

Step 208: The initial leak flow rate measured in Step 201 is compared to the residual leak flow rate measured in Step 207 to assess whether leaking has reduced or not. If the leaking has not reduced due to the treatment, it indicates that there are large holes or missing pieces of pipe within the pipe system. If the reduction is less than 10%, preferably less than 5%, then it can be deemed that the leaking has not reduced. This can be verified if the sealing composition leak flow rate was measured during Step 204 and it showed significant leaking. If the sealing composition leak flow rate was minimal but existent compared to the other two leak flow rates, it is possible that an error has happened in one of the leak flow rate measurements and the measurement setting should be checked and then returned to Step 201. It is also possible that all three leak flow rate measurements showed no leaking in which case the pipe system was not initially leaking but it has now been strengthened due to the treatment. Execution of the method can be ended in Step 210.

If the leaking has reduced, for example over 10% or preferable more than 5%, it indicates that the treatment performed in steps 202 to 206 has significantly reduced area of the leaking portions of the pipe system. This is an indirect indication of the pipe system having multiple tiny holes, apertures, cracks or other leaking portions because a thin film of dried sealing compositions within these portions has caused a significant reduction in leaks through these portions. The method should be provisionally repeated.

Step 209: If the reduction in leaking between initial leak flow rate measurement and residual leak flow rate measurement is 100% it means that the pipe system was initially leaking but the treatment performed in steps 202 to 206 has plugged or sealed any holes, apertures or cracks which caused the initial leaking. The problem has been solved execution of the method can be ended in Step 210. In an embodiment, Step 209 is omitted and in case of reduced leaking in Step 208, the method continues from Step 202 in every case. This ensure that after the treatment performed in steps 202 to 206 has plugged or sealed any holes, apertures or cracks which caused the initial leaking, the pipe system is treated one more time to strengthen the portions which caused the initial leaking by forming another thin film of dried sealing composition on top of the previous layer.

If the reduction in leaking between initial leak flow rate measurement and residual leak flow rate measurement is less than 100% it means that the pipe system was initially leaking but the treatment performed in steps 202 to 206 has reduced leaking through any holes, apertures or cracks which caused the initial leaking. In this case the treatment should be done again to further reduce leaking or completely stop it. Execution of the method continues from Step 202.

Step 202: When the treatment is repeated after residual leak flow rate measurement and comparison to initial leak flow measurement, the drained sealing composition collected into a container during Step 205 is now re-used by introducing it to the pipe system. This eliminates production of sealing composition waste and enables use of the method since majority of the sealing composition introduced into the pipe system in Step 202 is drained from the pipe system in Step 205 and can be used again.

It is apparent to a person skilled in the art that the above exemplary embodiments are rather simple in operation for the purposes of illustration. By following the model shown in this patent application, it is possible to construct different and even very complex solutions that utilise the inventive idea disclosed in this patent application.

I claim:

1. A method of reducing a leak or a risk of a leak of a pipe system, comprising:
   a. introducing a sealing composition into said pipe system;
   b. removing gases from said pipe system and filling the pipe system with said sealing composition;
   c. applying pressure to said sealing composition within said pipe system; and
   d. draining said pipe system partially of said sealing composition and collecting the drained sealing composition;
   wherein said sealing composition is a single component composition comprising metal powder and xylenes, and said partial draining leaving a film of said sealing composition onto an inner surface of said pipe system.

2. A method according to claim 1, wherein a thickness of said film is on average less than 500 micrometres on the inner surface of the pipe system.

3. A method according to claim 1, wherein the sealing composition has solids content of at least 40% of weight.

4. A method according to claim 1, wherein the sealing composition comprises aluminium powder.

5. A method according to claim 1, wherein the sealing composition comprises zinc oxide.

6. A method according to claim 1, wherein the method further comprises measuring of initial leak flow rate of the pipe system prior to the step of introducing a sealing composition into said pipe system and measuring of residual leak flow rate of the pipe system after said film of the sealing composition on inner surface of said pipe system has been allowed to dry.

7. A method according to claim 6, wherein said method is repeated by re-using the sealing composition collected during a previous treatment at least until either a residual leak flow rate measurement shows no leak, or less than 5% reduction is measured in the residual leak flow rate compared to the initial leak flow rate measurement.

8. A method according to claim 6, wherein the measuring of the initial leak flow rate and measuring of the residual leak flow rate comprises pumping of air into the pipe system until a predetermined air pressure within the pipe system is reached.

9. A method according to claim 1, wherein said partial draining of the pipe system comprises pumping said sealing composition from the pipe system to a container.

10. A method according to claim 1, wherein said sealing composition is a single component composition comprising metal powder and at least one of m-xylene, p-xylene and o-xylene.

11. A method according to claim 1, wherein said sealing composition is a single component composition comprising at least 3 weight percent of metal powder and at least 25 weight percent but less than 50 weight percent of reaction mass of m-xylene and o-xylene and p-xylene and ethylbenzene.

* * * * *